(12) United States Patent
Kelliher et al.

(10) Patent No.: US 6,853,936 B1
(45) Date of Patent: Feb. 8, 2005

(54) METHOD AND SYSTEM FOR CALIBRATING MULTIPLE CAMERAS WITH POTENTIALLY NON-OVERLAPPING FIELDS OF VIEW

(75) Inventors: Timothy Patrick Kelliher, Scotia, NY (US); Peter Henry Tu, Schenectady, NY (US); Jens Rittscher, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/674,487

(22) Filed: Sep. 30, 2003

(51) Int. Cl.[7] .............................. G06K 9/00; G06K 9/32
(52) U.S. Cl. ........................... 702/94; 702/85; 382/106; 382/294; 340/567
(58) Field of Search .................... 702/85, 94; 348/143; 382/294–296, 285, 106, 107; 358/504; 340/567; 701/207–209, 211, 213

(56) References Cited

U.S. PATENT DOCUMENTS

| | | | |
|---|---|---|---|
| 5,991,444 A | 11/1999 | Burt et al. | |
| 6,078,701 A | 6/2000 | Hsu et al. | 382/294 |
| 6,393,163 B1 | 5/2002 | Burt et al. | 348/143 |
| 6,512,857 B1 | 1/2003 | Hsu et al. | 382/294 |
| 6,597,818 B2 | 7/2003 | Kumar et al. | 340/567 |

OTHER PUBLICATIONS

"Site Calibration for Large Indoor Scenes," Peter Tu; Jens Rittscher, Timothy Kelliher, IEEE Conference on Advanced Video and Signal Based Surveillance, 2003, pp. 1–6.

*Primary Examiner*—Kamini Shah
(74) *Attorney, Agent, or Firm*—Fletcher Yoder

(57) ABSTRACT

A camera calibration system providing a first transmitter capable of transmitting a first signal; a second transmitter capable of transmitting a second signal; a second receiver and a third transmitter capable of transmitting a first plurality of signals. The second receiver and the third transmitter being movable together as a common unit so that the second receiver receives the first signal and the second signal and so that the first plurality of signals are receivable by a first camera to be calibrated. The system provides for a processor in electrical communication with the second receiver and the first camera, the is processor capable of receiving a second plurality of signals from the first camera to be calibrated, the second plurality of signals indicative of receipt of said first plurality of signals. Further, the processor is capable of generating a third signal indicative of calibration of the first camera and being configured to determine a relative coordinate system of the common unit, the first transmitter and the second transmitter, and the first camera based at least in part on the first signal, the second signal, and the second plurality of signals.

22 Claims, 5 Drawing Sheets

METHOD AND SYSTEM FOR CALIBRATING MULTIPLE CAMERAS WITH POTENTIALLY NON-OVERLAPPING FIELDS OF VIEW

BACKGROUND OF THE INVENTION

The present disclosure relates generally a method and system for calibrating cameras. More particularly, the present disclosure relates to a method and system of calibrating cameras not having a common field of view.

Multiple cameras are calibrated to allow a large space to be observed. Such an area may be a room or a series of connected corridors that are under surveillance for security purposes. These cameras are often connected to several monitors to be viewed by a security professional in a single location.

Historically, determining the position and orientation of multiple cameras relative to each other has been a difficult and inaccurate procedure. The process required placing an object with known geometry, in a common field of view of two cameras. However, the irregularly shaped object and common field of view, or overlap, constrained the accuracy and limited the breadth of the surveillance system.

Accordingly, there is a continuing need to calibrate cameras that do not have a common field of view to eliminate one or more of the aforementioned drawbacks and deficiencies of prior calibration surveillance systems and methods.

BRIEF DESCRIPTION OF THE INVENTION

A camera calibration system providing for a first transmitter for transmitting a first signal; a second transmitter for transmitting a second signal; a second receiver; a third transmitter for transmitting a first plurality of signals, said second receiver and said third transmitter being movable together as a common unit so that said second receiver receives said first signal and said second signal and so that said first plurality of signals are receivable by a first camera to be calibrated. The system also provides for a processor in electrical communication with said second receiver and the first camera, said processor being capable of receiving a second plurality of signals from the first camera to be calibrated, said second plurality of signals indicative of receipt of said first plurality of signals, said processor capable of generating a third signal indicative of calibration of the first camera and being configured to determine relative coordinate system of said common unit, said first transmitter and said second transmitter, and the first camera based at least in part on said first signal, said second signal, and said second plurality of signals.

A method of calibrating cameras including transmitting a first signal from a first position; transmitting a second signal from a second position; positioning a movable unit in a third position so that said movable unit receives said first signal and said second signal when in said third position and so that said movable unit has a location device within a field of view of a first camera to be calibrated. The method further provides for transmitting a first plurality of signals from said location device receivable by the first camera; and transmitting a second plurality of signals to a processor from said first camera. The method further provides for determining a relative coordinate system based in part on said first, second and second plurality of signals; and moving said movable unit to a fourth position such that said movable unit receives each of said first and said second signals and said location device is within a field of view of a second camera to be calibrated.

A method of calibrating cameras including transmitting a first signal from a first position; transmitting a second signal from a second position; transmitting a first plurality of signals from a movable position within a field of view of a second sensor; and said movable position having a processor and a first sensor in electrical communication with one another. The method also provides that the processor is capable of receiving a second plurality of signals from said second sensor; determining a relative coordinate system based in part on said first signal said second signal, said second plurality of signals; and moving said movable position to a third position in a field of view of a third sensor such that said first sensor receives said first and said second signals.

The above-described and other features and advantages of the present disclosure will be appreciated and understood by those skilled in the art from the following detailed description, drawings, and appended claims.

DETAILED DESCRIPTION

Figure 1:
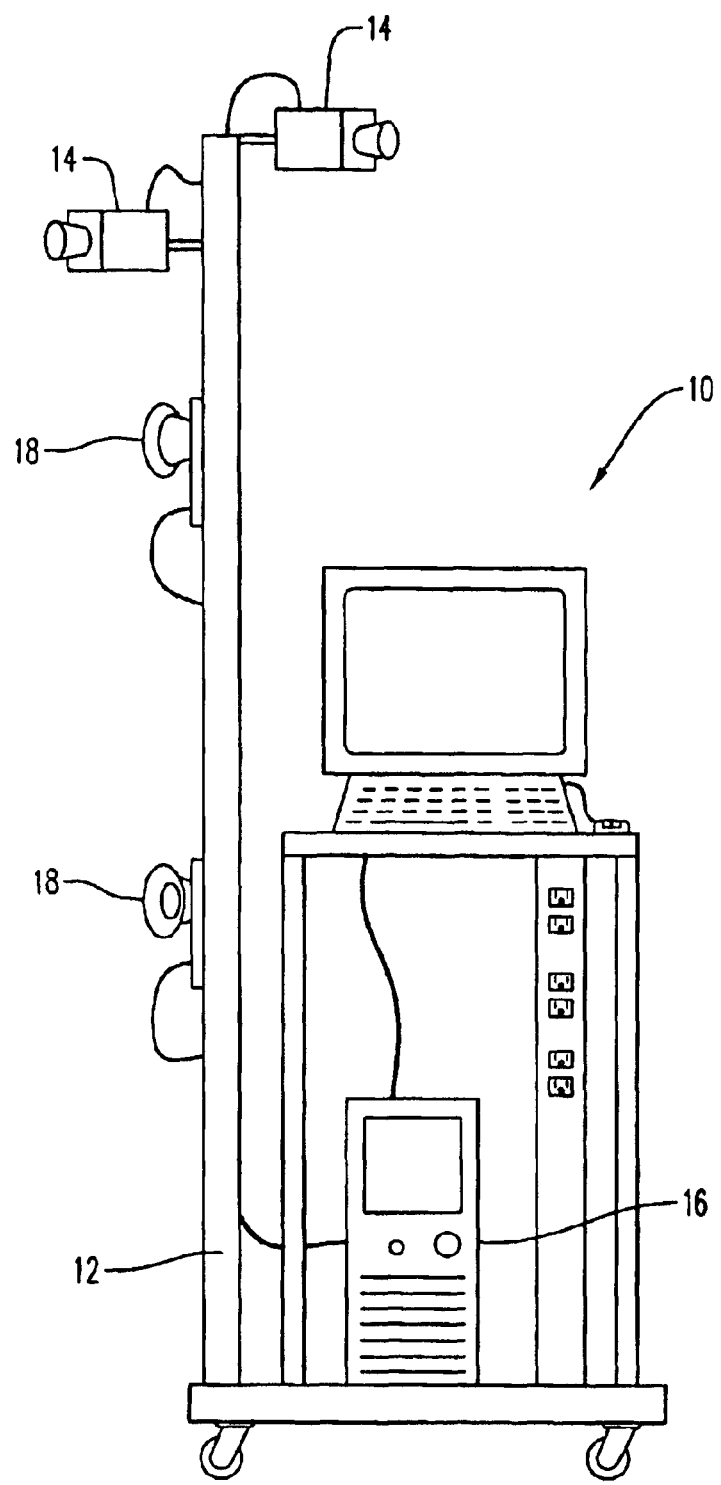
FIG. 1 illustrates an exemplary embodiment of a front view of camera calibration system.
Figure 2:
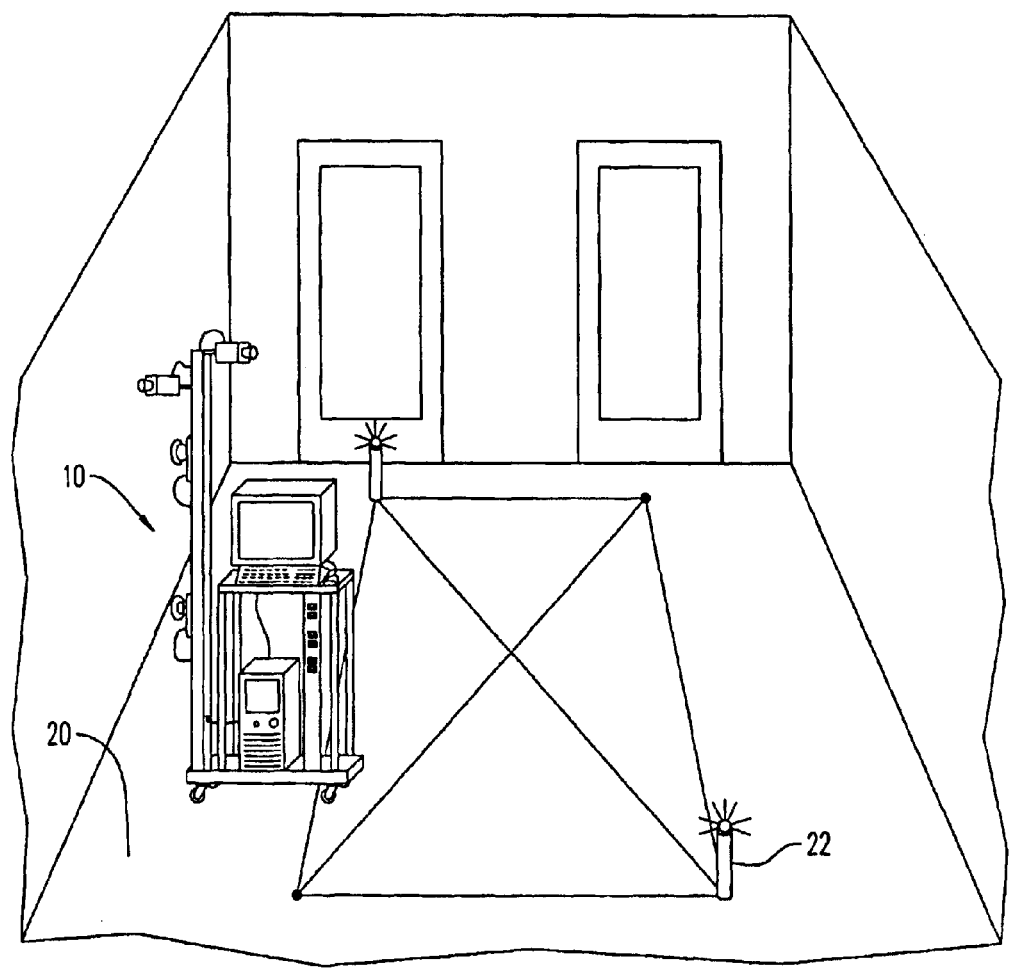
FIG. 2 is a schematic of a beacon on a flat surface to calibrate the cameras of the calibration system of FIG. 1.

Referring now to the drawings and in particular to FIGS. 1 and 2, an exemplary embodiment of a camera calibration system generally referred to by reference numeral 10 is illustrated. System 10 has very few components configured to calibrate multiple cameras that observe flat surface 20. For example, a cart 12 can support a plurality of sensors 14 and a computer 16. Cart 12 can also support at least one rigidly mounted landmark but preferably a plurality of rigidly mounted landmarks 18 is preferred mounted at different heights on cart 12. For purposes of illustration, 2 landmarks 18 are shown. The location of sensor cameras 14 and landmarks 18 are known relative each other on cart 12. Sensors 14 and beacons 22 allow system 10 to obtain accurate data about the position and orientation of cart 12. System 10 calibrates multiple cameras by establishing relative positions in between these cameras.

Referring now to FIGS. 1 and 2, cart 12 is positioned on flat surface 20 near a plurality of beacons 22. The position of cart 12 is arbitrary. System 10 uses the position of cart 12 as a mathematical reference from which relative positions of the plurality beacons 22 will be calculated. The plurality of beacons 22 are shown as lights; however, any transmitters capable of producing, for example sound or a magnetic field could be used. Sensor cameras 14 sense beacons 22 positioned on flat surface 20. Sensor cameras 14 are shown; however, any receiver capable of receiving information from a specific transmitter could be used. Sensor cameras 14 and computer 16 are operatively connected to capture data from beacons 22. From these data, computer 16 computes a plurality of positions for beacons 22 on flat surface 20 relative to cart 12 and stores these positions. When beacons 22 are moved, computer re-computes new positions for the beacons 22 on flat surface 20. These positions are stored by computer 16 and must be determined accurately because they will be used to calculate the exact coordinates of cart 12 when it is moved to a new location.

Figure 3:
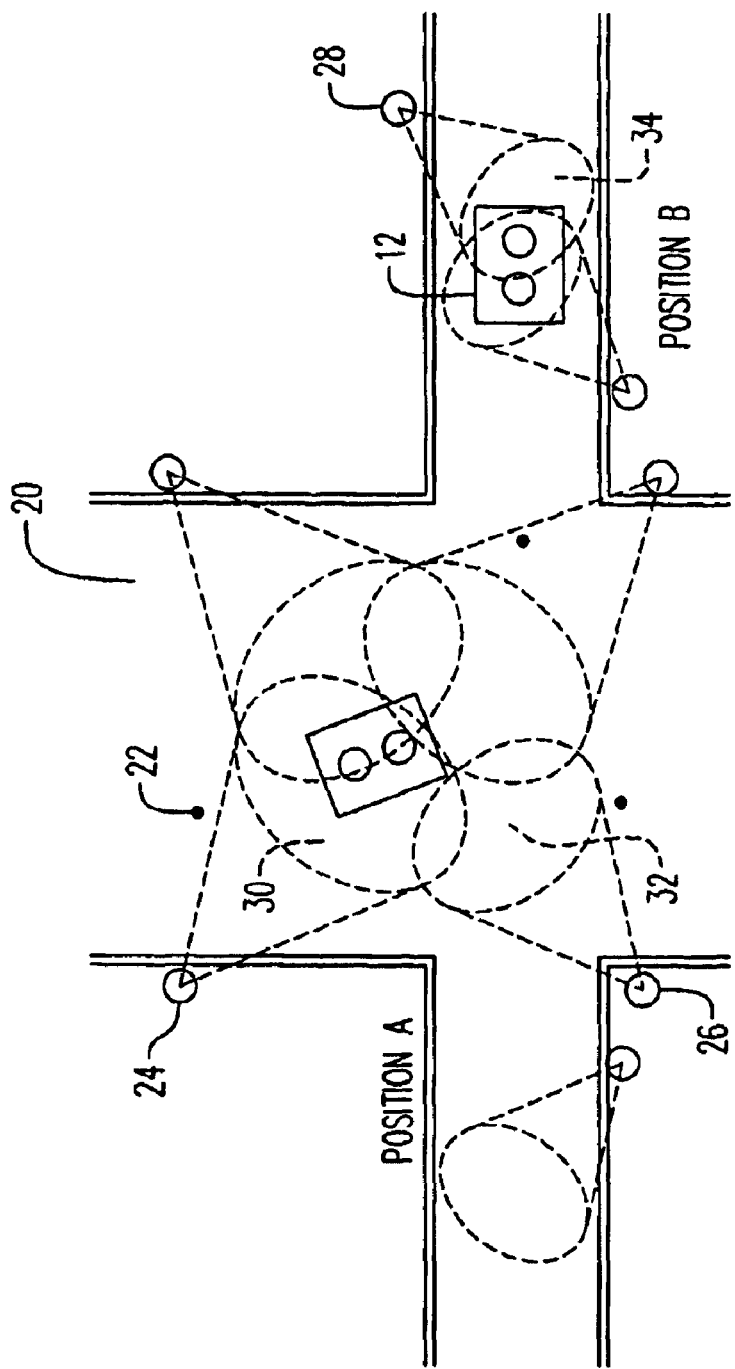
FIG. 3 is an exemplary embodiment of two hallways having surveillance cameras and the calibration system of FIG. 1.

Referring now to FIG. 3, computer 16 is operatively connected to surveillance cameras 24, 26, and 28 having fields of view 30, 32 and 34, respectively, on flat surface 20. The position of cart 12, thus landmarks 18 is known and stored by computer 16. Fields of view 30 and 32 do not overlap. Cart 12 is in field of view 30 of camera 24. When cart 12 is in position A, computer 16 captures data from surveillance camera 24 and stores positions of landmarks 18. Camera 24 must capture at least eight images of landmarks 18. For example, cart 12 has two landmarks 18. Therefore, cart 12 must be moved at least four times for camera 24 to capture eight images of landmarks 18 in position A. Computer 16 stores images as data for camera 24 for calculations of camera 24 position relative to cameras 26 and 28. Landmarks 18 are shown as lights; however, any transmitters capable of producing for example sound or a magnetic field could be used. In position B, the same process is repeated with respect to camera 28 having field of view 34. In position B camera 28 must collect at least eight images of landmarks 18 from cart 12. Computer 16 captures data from camera 28 and stores them. Computer 16 can compute a relative position in between cameras 24 and 28. Cart 12 can be moved into field of view 32 of camera 26 to collect eight images of landmarks 18. After capturing data from cameras 24, 26 and 28, computer 16 can calibrate their positions relative to each other over surface 20.

Figure 4:
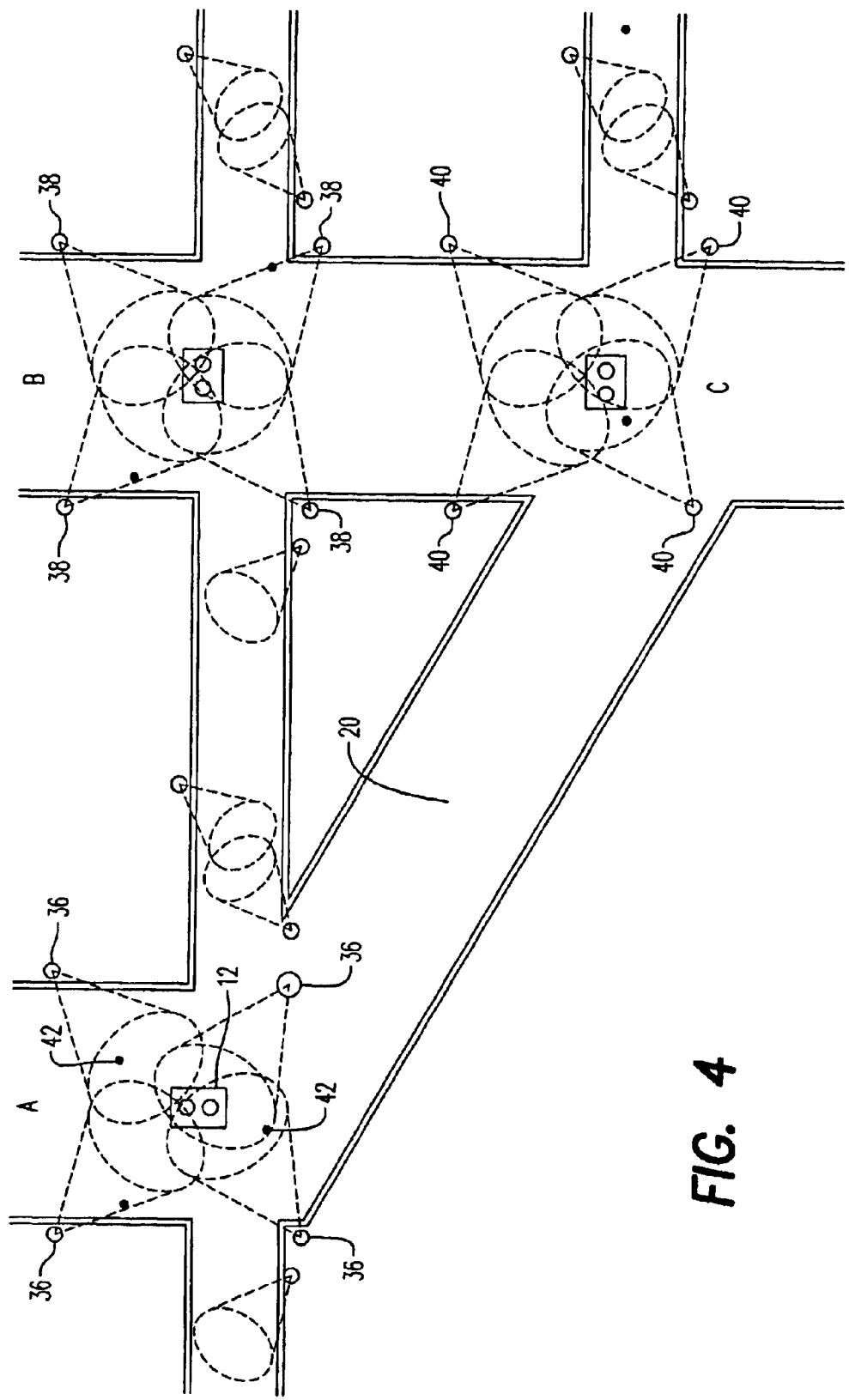
FIG. 4 is a schematic of an embodiment of the calibration system in a series of hallways.

Referring to FIG. 4, the method of the invention will be explained by way of example. Computer 16 is operatively connected to a plurality of surveillance cameras 36, 38 and 40 and sensor cameras 14. In FIG. 4, there are three locations on flat surface 20, specifically Locations A, B and C. Locations A, B and C, each have a plurality of surveillance cameras 36, 38 and 40, respectively. Initially, cart 12 is in field of view of the plurality of cameras 36 at Location A, although its initial position is arbitrary. Cameras 36 in Location A have overlapping fields of view. Beacons 42 are placed near cart 12 on flat surface 20 in Location A. Sensor cameras 14 capture data from cart 12 and computer 16 computes positions for beacons 42 relative to cart 12. In Location A, each of the plurality of cameras 36 must capture at least eight images of landmarks 18 to be calibrated relative to cameras 38 and 40. Computer 16 stores these images as data from the plurality of surveillance cameras 36 in Location A and computes their location with respect to cart 12. Beacons 42 are moved multiple times and new positions are continually stored by computer 16. Computer 16 will use beacon positions to calculate an accurate position of cart 12 when it is moved to location B. Beacons 42 can be moved closer to cameras 38 in location B such that they will be in view of sensors 14 when cart 12 is in view of cameras 38.

Cart 12 can be moved to Location B in field of view of the plurality of surveillance cameras 38. Sensors 14, in Location B, must be capable of observing beacons 42 still in Location A. Computer 16 relates the new position of cart 12 to the known position of beacons 42 using known mathematical principles. Computer 16 can infer the position of cart 12 in location B. Again as in location A, in Location B, each of the plurality of cameras 38 must capture eight images of landmarks 18 that are stored by computer 16 as data for calibration of relative position. A relative position of cameras 38 can be determined because the position of landmarks 18 on cart 12 are known with respect to beacons 42. Computer 16 is able to relate the position of surveillance cameras in Locations A and B because each camera was referenced to the cart 12 of known position on surface 20.

In location C, camera sensors 14 of cart 12 must be able to observe beacons 42 in location B. Computer 16 relates the new position of cart 12 to the known position of beacons 42 still in Location B. Computer 16 can infer the position of cart 12 in Location C using known mathematical principles. Surveillance cameras 40 have overlapping fields of view and must capture at least eight images of landmarks 18 from cart 12 of known position. Computer 16 captures these images as data from the plurality of cameras 40 and computes the relative positions of surveillance cameras 40 to cart 12. Computer 16 will also relate the positions of the plurality of surveillance cameras 40, to the relative positions of surveillance cameras 36 and 38 even though they do not have any fields of view in common. Furthermore, error reduction by camera calibration system 10 is achieved by ensuring cart 12 returns to Location A and repeats the process in locations B and C over surface 20.

A second exemplary embodiment of system 10 is described with reference to FIG. 5. Again system has a plurality of cameras 36, 38 and 40 and computer 16 connectable to a security monitor 48. System 10 also includes a security monitor 42, a synthetic image 44, flat surface 20 and a connection 46 to connect computer 16 to monitor 48. Synthetic image 44 is created using appropriate software resident on computer 16. Synthetic image 44 is a real-time virtual image that can be supplied with actual objects on flat surface 20. Synthetic image 40 does not require overlapping fields of view for its creation. In this embodiment, a security professional can view monitor 48 and observe surface 20 by observing a single synthetic image 44, instead of viewing actual images of surface 20 on multiple monitors.

Figure 5:
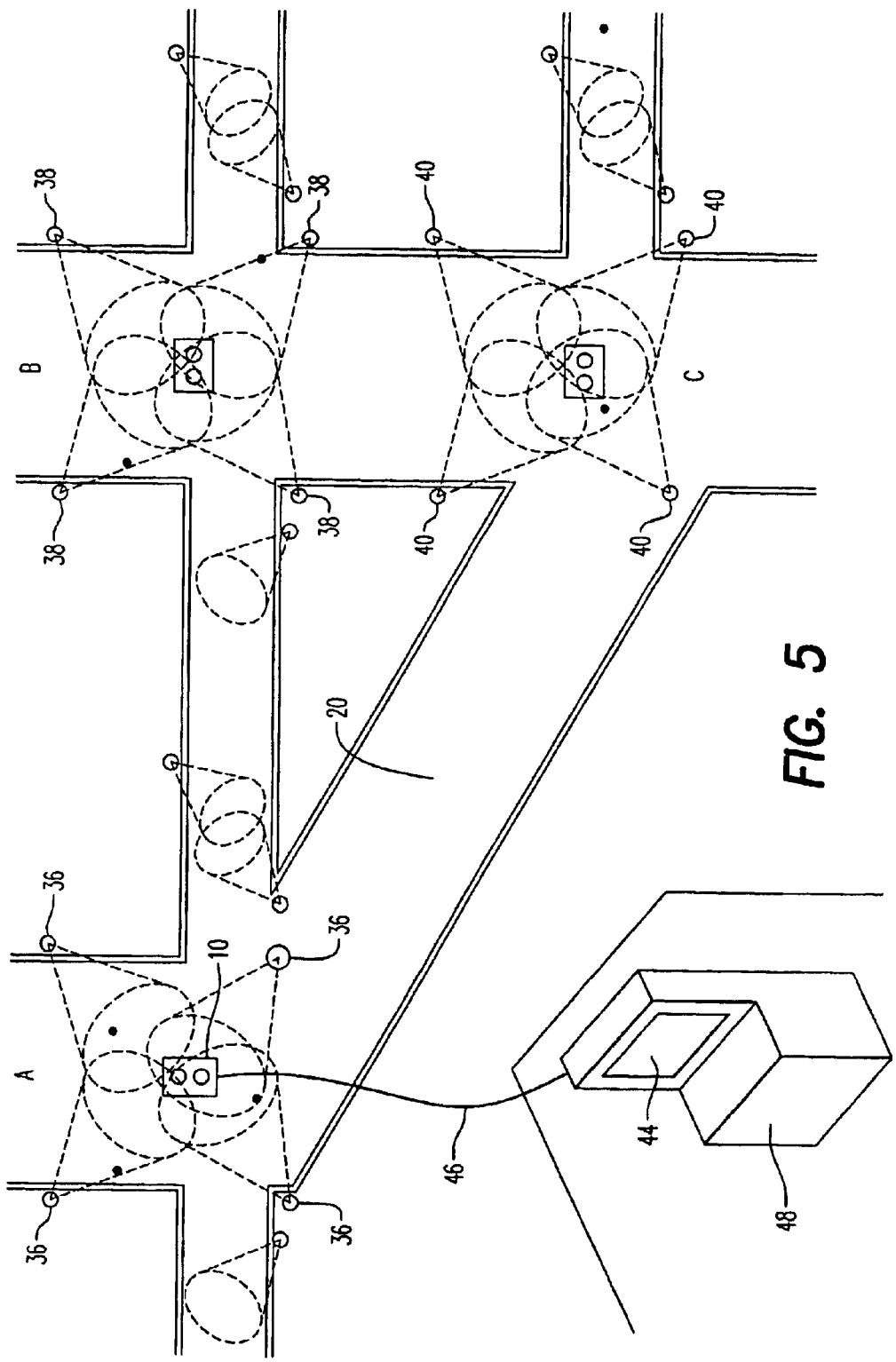
FIG. 5 is a second embodiment of the calibration system with a security monitor.

System 10 of FIG. 5 can be used for a modeling application. For example, computer 16 could capture data from the plurality of surveillance cameras 36, 38 and 40. An object such as a person could be observed on a flat surface 20. In this application, computer 16 could manipulate such data to generate a three-dimensional rendition of a person's body part. For example, if only a side view of a person's face is visible by a surveillance camera, data representing that face portion could be rotated to complete a three-dimensional model of the face to more easily identify the face.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A camera calibration system comprising:
a first transmitter for transmitting a first signal;
a second transmitter for transmitting a second signal;
a second receiver;
a third transmitter for transmitting a first plurality of signals, said second receiver and said third transmitter being movable together as a common unit so that said second receiver receives said first signal and said second signal and so that said first plurality of signals are receivable by a first camera to be calibrated; and a processor in electrical communication with said second receiver and the first camera, said processor being capable of receiving a second plurality of signals from the first camera to be calibrated, said second plurality of signals indicative of receipt of said first plurality of signals, said processor capable of generating a third signal indicative of calibration of the first camera and being configured to determine a relative coordinate system of said common unit, said first transmitter and said second transmitter, and the first camera based at least in part on said first signal, said second signal, and said second plurality of signals.

2. The camera calibration system according to claim 1, wherein said processor forms part of said common unit.

3. The camera calibration system according to claim 1, wherein said first signal and said second signal are selected from the group consisting of light, sound and magnetic fields.

4. The camera calibration system according to claim 1, wherein said processor is configured to update said relative coordinate system based on movement of one of said common unit and said first transmitter.

5. The camera calibration system according to claim 1, wherein said processor is configured to relate a second camera to be calibrated to said relative coordinate system when the second camera receives a third plurality of signals from said third transmitter and said processor receives a fourth plurality of signals from the second camera.

6. The camera calibration system according to claim 1, wherein said processor is connectable to a security monitor.

7. The camera calibration system according to claim 5, wherein said first plurality of signals are at least eight in number and said third plurality of signals are at least eight in number.

8. The camera calibration system according to claim 7, wherein said processor is capable of generating a single image based in part on said first plurality and said third plurality of signals.

9. A method of calibrating cameras comprising:

transmitting a first signal from a first position;

transmitting a second signal from a second position;

positioning a movable unit in a third position so that said movable unit receives said first signal and said second signal when in said third position and so that said movable unit has a location device within a field of view of a first camera to be calibrated;

transmitting a first plurality of signals from said location device receivable by the first camera;

transmitting a second plurality of signals to a processor from said first camera said second plurality of signals representative of receipt of said first plurality of signals;

determining a relative coordinate system based in part on said first, second and second plurality of signals; and moving said movable unit to a fourth position such that said movable unit receives each of said first and said second signals and said location device is within a field of view of a second camera to be calibrated.

10. The method according to claim 9, further comprising transmitting a third plurality of signals from said location device and calibrating a relative position between the first camera and the second camera based in part on said second plurality of signals and said third plurality of signals.

11. The method according to claim 10, further comprising transmitting the first signal from a fifth position; transmitting the second signal from a sixth position; moving said movable unit to a seventh position in a field of view of a third camera; so that said movable unit capable of receiving each of said first and the second signals.

12. The method according to claim 11, further comprising transmitting a fourth plurality of signals from said location device; and relating said third camera to said relative coordinate system based in part on at least one of the first signal and said second signal and said fourth plurality of signals.

13. The method according to claim 12, wherein each of said plurality of signals number at least eight signals.

14. The method according to claim 12, wherein the first camera is capable of receiving said fifth plurality of signals from said location device to enhance said relative coordinate system.

15. A method of calibrating cameras comprising:

transmitting a first signal from a first position;

transmitting a second signal from a second position;

transmitting a first plurality of signals from a movable position within a field of view of a second sensor, said movable position having a processor and a first sensor in electrical communication with one another, said processor capable of receiving a second plurality of signals from said second sensor;

determining a relative coordinate system based in part on said first signal said second signal, said second plurality of signals; and moving said movable position to a third position in a field of view of a third sensor such that said first sensor receives said first and said second signals.

16. The method according to claim 15, further comprising transmitting a third plurality of signals from said movable position, and transmitting a fourth plurality of signals to said processor and relating a third sensor to said second sensor, based in part on said first signal, said second signal and said third plurality of signals.

17. The method according to claim 16, wherein said first plurality and said third plurality of signals are each eight in number.

18. The method according to claim 15, wherein the second sensor and the third sensor have mutually exclusive fields of view.

19. The method according to claim 16, wherein said processor is connectable to a security monitor and capable of manipulating said second plurality of signals and said fourth plurality of signals.

20. The method according to claim 15, further comprising transmitting the first signal from a fourth position and transmitting the second signal from a fifth position.

21. The method according to claim 18, further comprising moving said movable position to a sixth position in a field of view of a fourth sensor such that said fourth sensor senses each of the first signal in a fourth position and the second signal in a fifth position; transmitting a fifth plurality of signals from said movable position; and relating the fourth sensor to the second sensor and the third sensor to said relative coordinate system based at least in part on the second plurality of signals, said fourth plurality of signals and said fifth plurality of signals.

22. The method according to claim 19, wherein said second sensor is capable of sensing a sixth plurality of signals from said movable position.

* * * * *